(12) United States Patent
Ejima et al.

(10) Patent No.: US 8,228,398 B2
(45) Date of Patent: Jul. 24, 2012

(54) ELECTRONIC CAMERA SYSTEM, ELECTRONIC CAMERA, CRADLE, IMAGE STORAGE APPARATUS, AND PROGRAM

(75) Inventors: Satoshi Ejima, Tokyo (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 190 days.

(21) Appl. No.: 12/801,969

(22) Filed: Jul. 6, 2010

(65) Prior Publication Data

US 2010/0302381 A1    Dec. 2, 2010

Related U.S. Application Data

(63) Continuation of application No. 11/920,357, filed as application No. PCT/JP2006/311859 on Jun. 13, 2006, now abandoned.

(30) Foreign Application Priority Data

Jun. 15, 2005   (JP) .................................. 2005-175582

(51) Int. Cl.
   *H04N 5/76* (2006.01)
   *H04N 5/225* (2006.01)
(52) U.S. Cl. .................. 348/231.2; 348/231.8; 348/375; 348/373
(58) Field of Classification Search .. 348/207.99–207.2, 348/231.2, 231.9, 375, 373; 345/536–538
   See application file for complete search history.

(56) References Cited

U.S. PATENT DOCUMENTS

| | | |
|---|---|---|
| 2002/0149695 A1 | 10/2002 | Kayanuma |
| 2003/0053124 A1 | 3/2003 | Iijima et al. |
| 2003/0095196 A1 | 5/2003 | Misawa |
| 2004/0021669 A1* | 2/2004 | Fredlund et al. ............... 345/530 |
| 2004/0201737 A1* | 10/2004 | Baron et al. ............... 348/231.2 |
| 2005/0088525 A1 | 4/2005 | Stavely et al. |
| 2005/0219637 A1 | 10/2005 | Sasagawa |

FOREIGN PATENT DOCUMENTS

| | | |
|---|---|---|
| JP | A-2002-353965 | 12/2002 |
| JP | A-2003-023566 | 1/2003 |
| JP | A-2003-158704 | 5/2003 |
| JP | A-2003-169243 | 6/2003 |
| JP | A-2003-244523 | 8/2003 |
| JP | A-2003-274272 | 9/2003 |
| JP | A-2003-338976 | 11/2003 |
| JP | A-2004-040468 | 2/2004 |

OTHER PUBLICATIONS

European Patent Office, European Search Report for EP 10 19 0750, dated Feb. 4, 2011, pp. 1-8.

* cited by examiner

*Primary Examiner* — Lin Ye
*Assistant Examiner* — Euel Cowan
(74) *Attorney, Agent, or Firm* — Oliff & Berridge, PLC

(57) ABSTRACT

An electronic camera system has an electronic camera and a cradle. The electronic camera includes an image pickup section that photoelectrically converts a subject image to generate image data, a first recording section that records image data, a first connecting terminal used for transmission/reception of data to/from an outside of the camera, and a camera controlling section that transfers the image data to the outside of the camera. The cradle includes a second connecting terminal constructed to be capable of engaging with the first connecting terminal, a cradle controlling section that transmits/receives data to/from the electronic camera, and a second recording section in which the image data transferred from the electronic camera can be recorded. Also, at least one of the electronic camera and the cradle further includes a transfer determination section which determines a possibility of transferring the image data based on predetermined authentication information.

20 Claims, 8 Drawing Sheets

CAMERA SIDE CONNECTION HISTORY DATA (a)

| | CONNECTION DATE AND TIME | CRADLE SIDE AUTHENTICATION INFOMATION | OPERATION MODE |
|---|---|---|---|
| 1 | 06.01.01 | ○××△123 | FIRST OPERATION MODE |
| 2 | 06.01.03 | ○××○789 | SECOND OPERATION MODE |
| 3 | 06.01.19 | ○××△123 | FIRST OPERATION MODE |
| 4 | 06.02.15 | ○×△△456 | SECOND OPERATION MODE |
| ⋮ | ⋮ | ⋮ | ⋮ |

CRADLE SIDE CONNECTION HISTORY DATA (b)

| | CONNECTION DATE AND TIME | CAMARA SIDE AUTHENTICATION INFOMATION | OPERATION MODE |
|---|---|---|---|
| 1 | 06.01.01 | N○×△111 | FIRST OPERATION MODE |
| 2 | 06.01.19 | N○×△111 | FIRST OPERATION MODE |
| 3 | 06.01.22 | N××○953 | SECOND OPERATION MODE |
| 4 | 06.02.03 | N×○△478 | FIRST OPERATION MODE |
| ⋮ | ⋮ | ⋮ | ⋮ |

FIG. 6

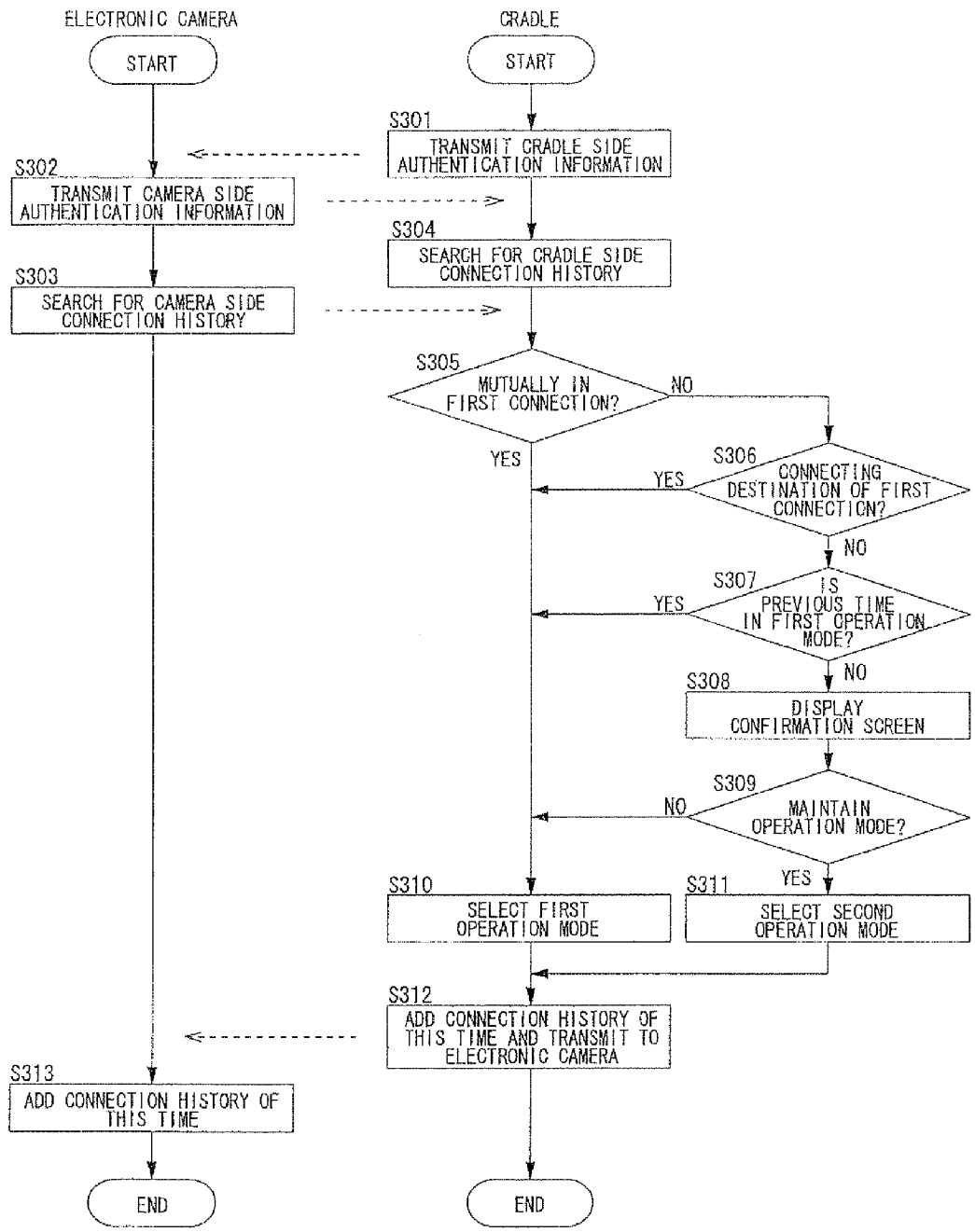
F I G. 7

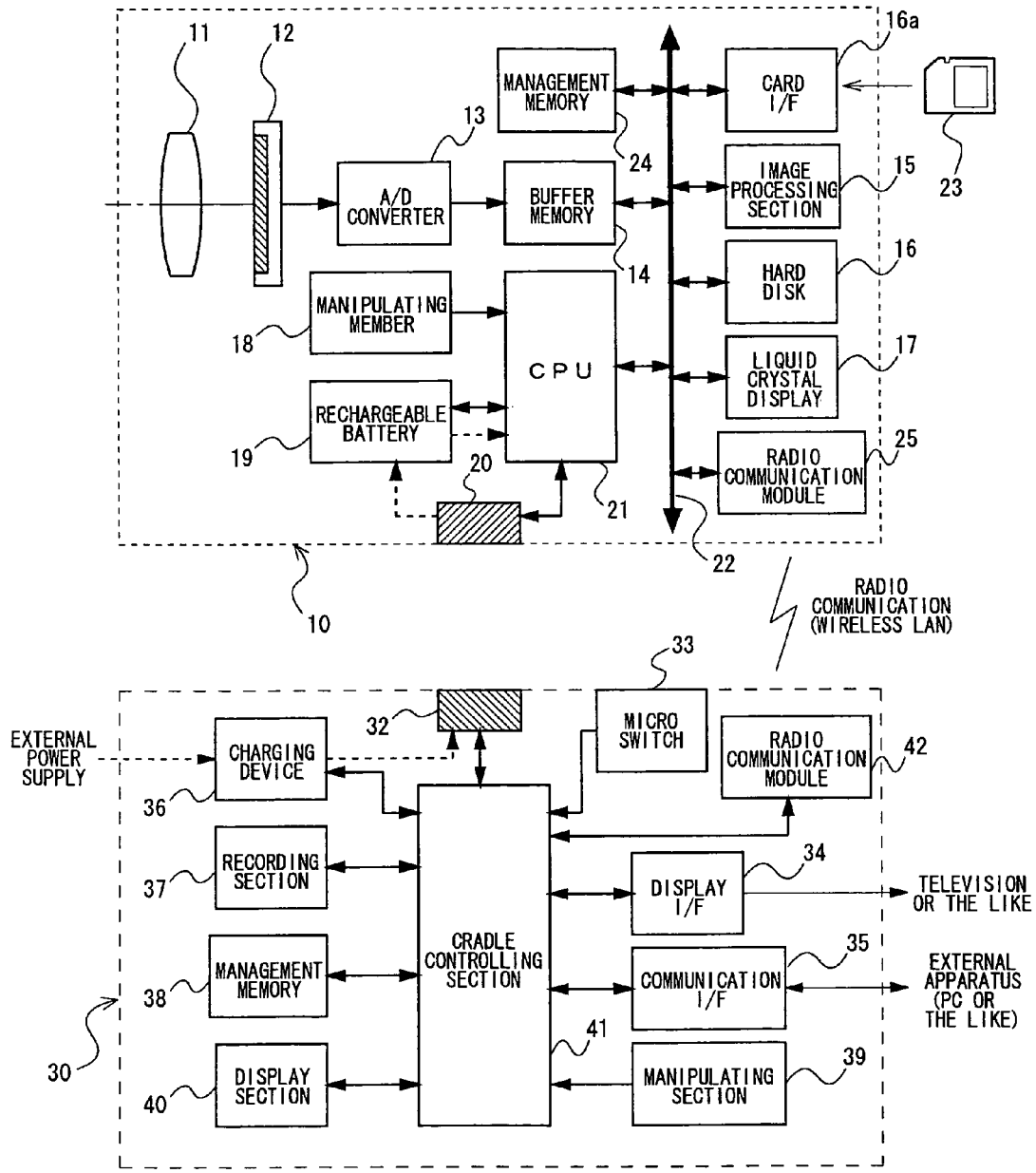
F I G. 8

ELECTRONIC CAMERA SYSTEM, ELECTRONIC CAMERA, CRADLE, IMAGE STORAGE APPARATUS, AND PROGRAM

This is a Continuation of application Ser. No. 11/920,357 filed Nov. 14, 2007, which in turn is a U.S. National Stage Application of International Application Number PCT/JP2006/311859, filed Jun. 13, 2006, in which the International Application claims a priority date of Jun. 15, 2005 based on prior filed Japanese Application Number 2005-175582 the entire contents of which are incorporated herein by reference.

TECHNICAL FIELD

The present invention relates to an electronic camera and an electronic camera system having an electronic camera and a cradle.

BACKGROUND ART

In recent years, electronic cameras which record a subject image electronically are rapidly becoming popular. Among such electronic cameras, there is a model which has a stand-type expansion apparatus (cradle) as an accessory for facilitating viewing of a reproduced image on a monitor and charging of the camera (refer to Patent Document 1). Generally, a cradle is designed on the assumption to be used in a pair with a specific electronic camera, and there also exists a cradle which has a function to transfer image data automatically to the cradle side for storing when being connected to the electronic camera.

However, a conventional cradle has been desired to be improved in that there may occur a problem such that when an electronic camera is connected to another person's cradle when viewing a reproduced image, when charging, or the like for example, private image data are transferred and flown out to the another person's cradle inadvertently. Patent Document 1: Japanese Unexamined Patent Application Publication No. 2003-169243

DISCLOSURE

Problems to be Solved

The present invention is for solving the above-described problem of conventional technologies, and an object thereof is to provide an electronic camera system capable of preventing flowing out of image data against the user's intention when electronic camera and the cradle are connected.

Means for Solving the Problems

An electronic camera system of a first invention has an electronic camera and a cradle. The electronic camera includes an image pickup section, a first recording section, a first connecting terminal, and a camera controlling section. The image pickup section photoelectrically converts a subject image from a photographing optical system to generate image data. The first recording section records image data. The first connecting terminal is used for transmission/reception of data to/from an outside of the camera. The camera controlling section transfers the image data to the outside of the camera via the first connecting terminal. The cradle includes a second connecting terminal, a cradle controlling section, and a second recording section. The second connecting terminal is constructed to be capable of engaging with the first connecting terminal. The cradle controlling section transmits/receives data to/from the electronic camera via the second connecting terminal. In the second recording section, the image data transferred from the electronic camera can be recorded. Also, at least one of the electronic camera and the cradle further includes a transfer determination section which determines a possibility of transferring the image data based on predetermined authentication information. Then, the camera controlling section transfers the image data from the first recording section to the cradle when there is a permission from the transfer determination section.

In a second invention according to the first invention, the transfer determination section further includes a memory. The memory records a correspondence relation of necessity of erasing image data in the first recording section and necessity of recording image data in the second recording section with the authentication information. Then, the camera controlling section and the cradle controlling section change a recording state of the image data in the first recording section and the second recording section according to the authentication information.

In a third invention according to the first or the second invention, the electronic camera further includes a first authentication information holding section. The first authentication information holding section holds camera side authentication information. Also, the cradle further includes a second authentication information holding section. The second authentication information holding section holds cradle side authentication information correlated with specific camera side authentication information. Then, at least one of the camera controlling section and the cradle controlling section verifies the camera side authentication information and the cradle side authentication information to determine a possibility of transferring the image data.

In a fourth invention according to the first or the second invention, the transfer determination section has an input section which obtains an authentication input by a user, and an authentication section which performs the transfer permission when the authentication input is valid.

In a fifth invention according to any one of the first to the fourth invention, at least one of the electronic camera and the cradle further includes a connection detection section which detects a connection with the electronic camera. Then, the transfer determination section executes automatically a determination operation of a possibility of transfer when the electronic camera and the cradle are connected.

In a sixth invention according to any one of the first to the fifth invention, the electronic camera further includes a rechargeable battery. Also, the cradle further includes a charging device used for charge of the rechargeable battery.

An electronic camera of a seventh invention is connected to a cradle to constitute an electronic camera system. The electronic camera includes an image pickup section, a recording section, a connecting terminal, a transfer determination section, and a camera controlling section. The image pickup section photoelectrically converts a subject image from a photographing optical system to generate image data. The recording section records the image data. The connecting terminal is used for transmission/reception of data to/from the cradle. The transfer determination section determines a possibility of transferring the image data based on predetermined authentication information. The camera controlling section transfers the image data to the cradle via the connecting terminal when there is a permission from the transfer determination section.

A cradle of an eighth invention is connected to an electronic camera to constitute an electronic camera system. The cradle includes a connecting terminal, a transfer determination section, a cradle controlling section, and a second recording section. The connecting terminal is used for transmission/reception of data to/from the electronic camera. The transfer determination section determines a possibility of transferring the image data from the electronic camera based on predetermined authentication information. The cradle controlling section receives image data from the electronic camera via the connecting terminal when there is a permission from the transfer determination section. The second recording section is capable of recording the image data.

An electronic camera system of a ninth invention has an electronic camera and an image storage apparatus. The electronic camera includes an image pickup section and a first communication section. The image pickup section photoelectrically converts a subject image from a photographing optical system to generate image data. The first communication section executes transmission/reception of data to/from an outside and outputs the image data to the outside of the camera. The image storage apparatus includes a second communication section, a first recording section, and a display output section. The second communication section transmits/receives data to/from the first communication section. The first recording section is capable of recording the image data. The display output section outputs a display image based on the image data to an image display apparatus. Also, one apparatus selected from the electronic camera and the image storage apparatus further includes a first authentication recording section which records first authentication information. An other apparatus selected from the electronic camera and the image storage apparatus further includes a controlling section and a mode selecting section. The controlling section executes selectively one of a first operation mode and a second operation mode when being connected to the one apparatus. The mode selecting section selects one of the first operation mode and the second operation mode based on the first authentication information obtained from the one apparatus. Then, the controlling section in the first operation mode permits recording of the image data to the first recording section and outputting of the display image by the display output section. The controlling section in the second operation mode permits outputting of the display image by the display output section, and meanwhile prohibits recording of the image data to the first recording section.

In a tenth invention according to the ninth invention, the other apparatus further includes a first history recording section which records a connection history with the one apparatus together with the first authentication information of a connecting destination. Then, the mode selecting section selects one of the first operation mode and the second operation mode based on data in the first history recording section.

In an eleventh invention according to the tenth invention, the other apparatus further includes a second authentication recording section which records second authentication information. Also, the one apparatus further includes a second history recording section which records a connection history with the other apparatus together with the second authentication information of a connecting destination. Then, the mode selecting section selects the first operation mode and the second operation mode based on data in the first history recording section and the second history recording section.

In a twelve invention according to the eleventh invention, the mode selecting section selects the first operation mode when the one apparatus and the other apparatus mutually match with a connecting destination at a time of a first connection.

In a thirteenth invention according to the eleventh invention, the mode selecting section selects the second operation mode when at least one of the one apparatus and the other apparatus does not match with a connecting destination at a time of a first connection.

In a fourteenth invention according to the eleventh invention, at least one of the one apparatus and the other apparatus further includes a first manipulating section which accepts a change input of the first operation mode and the second operation mode from a user. Also, at least one of the first history recording section and the second history recording section further records operation mode data indicating an operation mode selected by the change input in a correlated manner with the connection history. Then, the mode selecting section selects the first operation mode and the second operation mode based on the operation mode data.

In a fifteenth invention according to the ninth invention, the image storage apparatus further includes a data output section which transfers the image data to an external apparatus which is different from the electronic camera. Then, the controlling section in the first operation mode permits transfer of the image data to the external apparatus. The controlling section in the second operation mode prohibits transfer of the image data to the external apparatus.

In a sixteenth invention according to the ninth invention, the electronic camera further includes a second recording section capable of recording the image data. Then, the controlling section in the first operation mode permits transfer of the image data from the first recording section to the second recording section. The controlling section in the second operation mode prohibits transfer of the image data from the first recording section to the second recording section.

In a seventeenth invention according to the ninth invention, the electronic camera further includes a second manipulating section which accepts a manipulation from a user. Then, the controlling section in the first operation mode permits manipulating on data in the first recording section by the second manipulating section. The controlling section in the second operation mode prohibits manipulating on data in the first recording section by the second manipulating section.

In a eighteenth invention according to the ninth invention, the electronic camera further includes a second recording section capable of recording the image data. Also, the image storage apparatus further includes a third manipulating section which accepts a manipulation from a user. Then, the controlling section in the first operation mode permits manipulating on data in the second recording section by the third manipulating section. The controlling section in the second operation mode prohibits manipulating on data in the second recording section by the third manipulating section.

An electronic camera of a nineteenth invention is an electronic camera constituting an electronic camera system together with an image storage apparatus. The aforementioned image storage apparatus includes a first authentication recording section which records first authentication information, a second communication section which executes transmission/reception of data to/from an outside, a first recording section, and a display output section which outputs a display image based on the image data to an image display apparatus. Also, the electronic camera includes an image pickup section, a first communication section, a controlling section, a first history recording section, and a mode selecting section. The image pickup section photoelectrically converts a subject image from a photographing optical system to generate image data. The first communication section executes transmission/reception of data to/from the second communication section and outputs the image data to the image storage apparatus.

The controlling section executes selectively one of a first operation mode and a second operation mode when being connected to the image storage apparatus. The first history recording section records a connection history with the image storage apparatus together with the first authentication information of a connecting destination. The mode selecting section selects one of the first operation mode and the second operation mode based on the first authentication information obtained from the image storage apparatus and data in the first history recording section. Then, the controlling section in the first operation mode permits recording of the image data to the first recording section and outputting of the display image by the display output section. The controlling section in the second operation mode permits outputting of the display image by the display output section, and meanwhile prohibits recording of the image data to the first recording section.

An image storage apparatus of a twentieth invention constitutes an electronic camera system together with an electronic camera. The aforementioned electronic camera includes a first authentication recording section which records first authentication information, an image pickup section which generates image data, and a first communication section which executes transmission/reception of data to/from an outside. Also, the image storage apparatus includes a second communication section, a first recording section, a display output section, a controlling section, a first history recording section, and a mode selecting section. The second communication section transmits/receives data to/from the first communication section. The first recording section is capable of recording the image data. The display output section outputs a display image based on the image data to an image display apparatus. The controlling section executes selectively one of a first operation mode and a second operation mode when being connected to the electronic camera. The first history recording section records a connection history with the electronic camera together with the first authentication information of a connecting destination. The mode selecting section selects one of the first operation mode and the second operation mode based on the first authentication information obtained from the electronic camera and data in the first history recording section. Then, the controlling section in the first operation mode permits recording of the image data to the first recording section and outputting of the display image by the display output section. The controlling section in the second operation mode permits outputting of the display image by the display output section, and meanwhile prohibits recording of the image data to the first recording section.

Note that one which expresses the structure regarding the above-described image storage apparatus by converting the structure into a program, an image processing method, a recording medium, or the like is also effective as a specific mode of the present invention.

Effect

In the present invention, only when there is a permission by a transfer determination section based on authentication information, image data are transferred from an electronic camera to a cradle, and when the electronic camera and the cradle are connected, flowing out of image data against the user's intention can be prevented.

BRIEF DESCRIPTION OF THE DRAWINGS

FIG. 6(a) is a schematic view showing camera side connection history data of a fourth embodiment, and FIG. 6(b) is a schematic view showing cradle side connection history data of the fourth embodiment;

FIG. 7 is a flowchart explaining operations of a CPU 21 and a cradle controlling section 41 in selection of an operation mode of the fourth embodiment; and FIG. 8 is a block diagram showing a structure of an electronic camera system of a fifth embodiment.

DETAILED DESCRIPTION OF THE EMBODIMENTS

Explanation of First Embodiment

Figure 1:
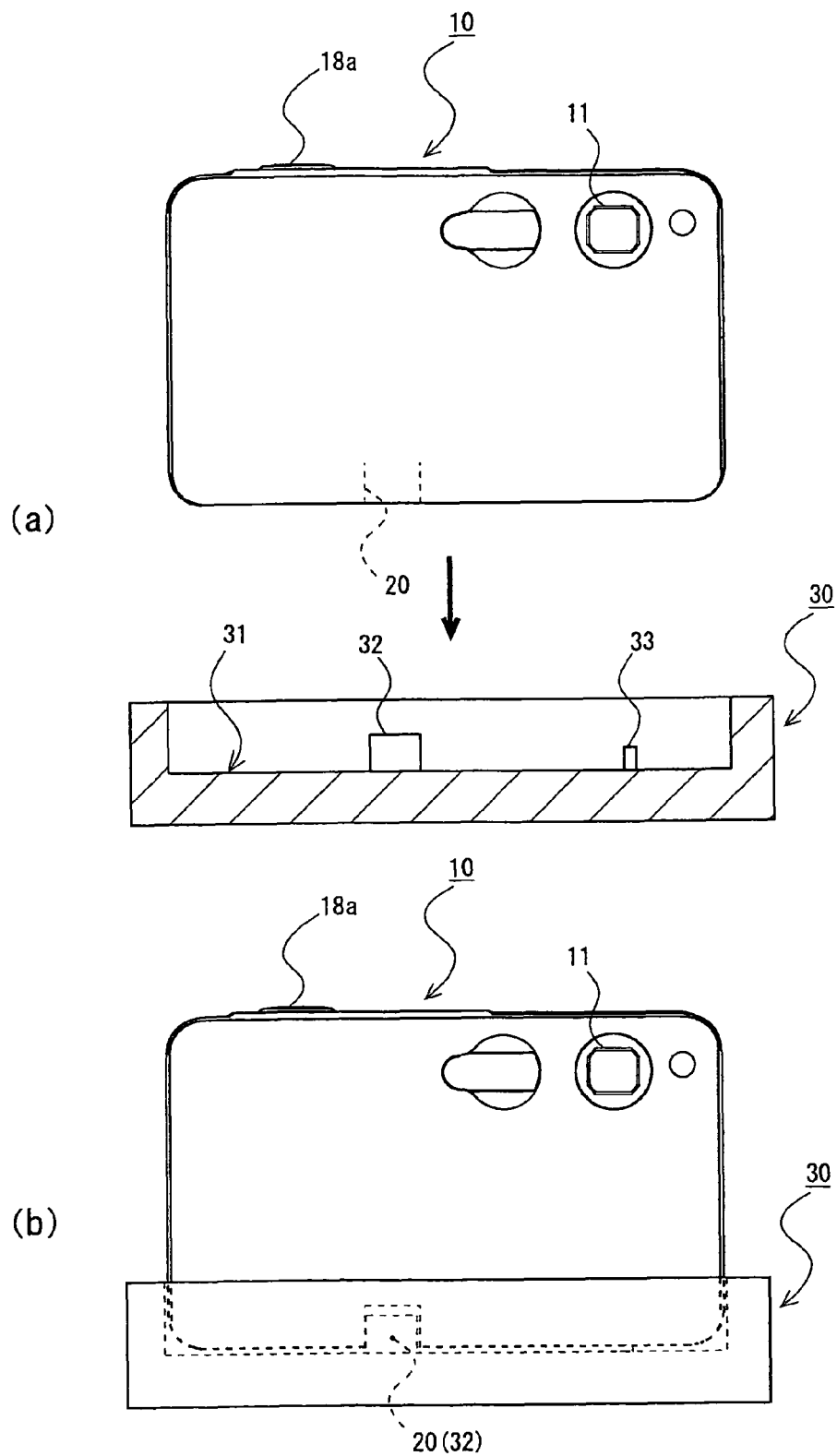
FIG. 1(a) and FIG. 1(b) are a schematic view showing an electronic camera system of a first embodiment.

FIG. 1(a) and FIG. 2(b) are a schematic view showing an electronic camera system of a first embodiment. The electronic camera system of the first embodiment has an electronic camera 10 and a cradle 30. In a bottom portion of this electronic camera 10, a first connecting terminal 20 is formed.

On the other hand, as shown in FIG. 1(a), in an upper face of the cradle 30, a camera receiving part 31 for mounting the electronic camera 10 is formed. On an inner face of the camera receiving part 31, there are arranged a second connecting terminal 32 having a male-female relationship with the first connecting terminal 20, and a microswitch 33. Then, as shown in FIG. 1(b), when the electronic camera 10 is arranged on the camera receiving part 31, the first connecting terminal 20 and the second connecting terminal 32 engage with each other to thereby establish an electrical connection between the electronic camera 10 and the cradle 30. Note that the cradle 30 can detect a connection state with the electronic camera 10 by whether the microswitch 33 is pressed or not.

Figure 2:
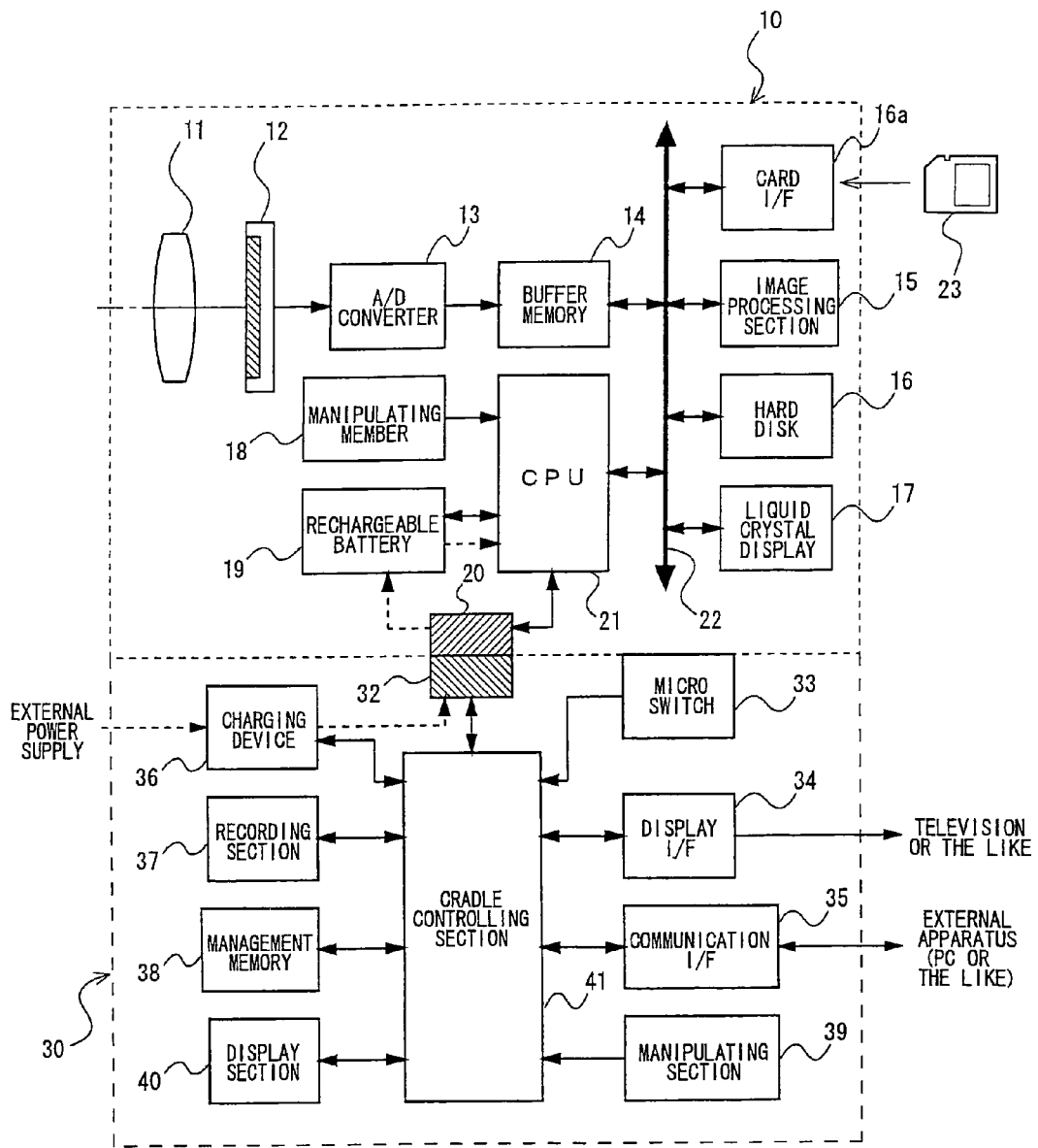
FIG. 2 is a block diagram showing a structure of the electronic camera system of the first embodiment.

FIG. 2 is a block diagram showing a structure of the electronic camera system of the first embodiment.

The electronic camera 10 has a photographing lens 11, an image pickup device 12, an A/D converter 13, a buffer memory 14, an image processing section 15, a hard disk 16, a card I/F 16a, a liquid crystal display 17 and a manipulating member 18, a rechargeable battery 19 which supplies power to each part of the camera, the first connecting terminal 20, a CPU 21 and a data bus 22. Note that the buffer memory 14, the image processing section 15, the hard disk 16, the card I/F 16a, the liquid crystal display 17 and the CPU 21 are connected via the data bus 22.

The image pickup device 12 photoelectrically converts optical flux which passes through the photographing lens 11 to generate an analog image signal of a subject image. The A/D converter 13 converts the analog image signal of the image pickup device 12 into a digital image signal. The buffer memory 14 temporarily saves image data in a preceding step or a subsequent step of image processing in the image processing section 15. The image processing section 15 performs image processing (defective pixel correction, gamma correction, interpolation, color conversion, edge enhancement, and/or the like) on the digital image signal to generate image data (moving image data or still image data). The image processing section 15 also executes compression/decompression processing of image data.

In the hard disk 16, the image data generated in the image processing section 15 are recorded. This hard disk 16 has a magnetic disk in a disk form having a surface coated with a magnetic material, a magnetic head which reads/writes data from/to the magnetic disk without contacting, a magnetic disk rotating mechanism such as a spindle motor, a magnetic head driving mechanism, and a controller which controls reading/writing of data (a detailed structure of the hard disk is omitted from the drawings).

In the card I/F 16*a*, a connector for connecting a recording medium 23 as an auxiliary recording means is formed. The recording medium 23 is constituted of a publicly known semiconductor memory or the like. Then, the card I/F 16*a* controls writing/reading of image data to/from the recording medium 23.

The liquid crystal display 17 displays reproduction display of image data recorded in the hard disk 16 or the recording medium 23, a setting screen for changing various settings of the camera, or the like. The manipulating member 18 is constituted of setting switches used for various setting of the camera, a release button (18*a*), and so forth. Also, the first connecting terminal 20 is connected to a signal input/output line from the CPU 21 and a power supply line to the rechargeable battery 19.

The CPU 21 controls the operation of each part of the electronic camera according to a sequence program stored in a not-shown ROM. For example, the CPU 21 executes transmission/reception of various data (image data or the like) to/from a cradle controlling section 41, which will be described later, when being connected to the cradle 30. The CPU 21 also executes a charging operation of the rechargeable battery when being connected to the cradle 30.

Also, the CPU 21 holds camera side authentication information (for example, information such as a password and a serial number) for enabling identification of individual cameras. Note that the camera side authentication information is transmitted to the cradle 30 side and used for determining the possibility of transferring image data by the cradle controlling section 41.

On the other hand, the cradle 30 has the second connecting terminal 32, the microswitch 33, a display I/F 34 and a communication I/F 35, a charging device 36, a recording section 37, a management memory 38, a manipulating section 39 and a display section 40, and a cradle controlling section 41. Note that the second connecting terminal 32 is connected to a signal input/output line from the cradle controlling section 41 and a power supply line of the charging device 36.

The display I/F 34 is an interface for outputting a reproduction display output of image data to a not-shown television or the like. This display I/F 34 has a publicly known video output terminal (for example, a composite video terminal, a separate video terminal, or the like).

The communication I/F 35 controls transmission/reception of data to/from an external apparatus (such as a personal computer) connected to the cradle 30 in compliance with a serial communication standard such as USB (Universal Serial Bus) or IEEE1394. The charging device 36 is supplied with power from a not-shown external power source and charges the rechargeable battery 19 of the electronic camera 10 via the first connecting terminal 20 and the second connecting terminal 32.

The recording section 37 is constituted of a hard disk or a semiconductor memory for example. The recording capacity of the recording section 37 is set larger than the recording capacity of the hard disk 16 of the electronic camera 10. Accordingly, image data taken by the electronic camera 10 can be transferred sequentially to the recording section 37 to be saved therein.

The management memory 38 records a correspondence relation between cradle side authentication information and processing rank information. Here, the cradle side authentication information is correlated with specific camera side authentication information. The cradle side authentication information is used for identifying on the cradle 30 side the electronic camera 10 which is allowed to transfer image data. Note that in the management memory 38 a plurality of cradle side authentication information can be registered, and thereby it is possible to share one cradle 30 by a plurality of electronic cameras 10.

Also, the processing rank information defines contents of various processing (necessity of erasing image data on the electronic camera 10 side and necessity of recording image data in the recording section 37) when transferring image data of the electronic camera system by dividing into four stages from rank A to rank D.

Specifically, (1) in rank A, the electronic camera 10 transfers image data to the cradle 30, the image data are recorded in the recording section 37, and the image data on the electronic camera 10 side as a transfer source are erased. (2) In rank B, the electronic camera 10 transfers image data to the cradle 30, and the image data are recorded in the recording section 37 while the image data on the electronic camera 10 side as a transfer source are left. (3) In rank C, the electronic camera 10 transfers image data to the cradle 30, but recording of the image data in the recording section 37 and erasing of the image data on the electronic camera 10 side are not performed. (4) In rank D, transfer of image data from the electronic camera 10 to the cradle 30 is prohibited. Note that in the first embodiment, when an electronic camera whose camera side authentication information does not correspond with the cradle side authentication information is connected, the same processing as the above-described rank D is performed.

The manipulating section 39 is used for instructing the cradle controlling section 41 to perform reading of image data from the electronic camera 10, or the like. Also, the manipulating section 39 is used for registration setting (registration of the electronic camera 10) of the camera side authentication information and the cradle authentication information and setting of the processing rank information.

The display section 40 displays information such as an operation state of the cradle 30 and available capacity of the recording section 37.

The cradle controlling section 41 controls each section of the cradle 30. For example, the cradle controlling section 41 executes an operation of saving image data transferred from the electronic camera 10 side in the recording section 37, an operation of outputting a reproduced image of image data to the outside from the display I/F 34, an operation of transferring image data to an external apparatus from the communication I/F 35, and so on. Also, the cradle controlling section 41 of the first embodiment executes verification of the camera side authentication information and the cradle side authentication information, and executes processing defined in the processing rank information together with the CPU 21.

Figure 3:
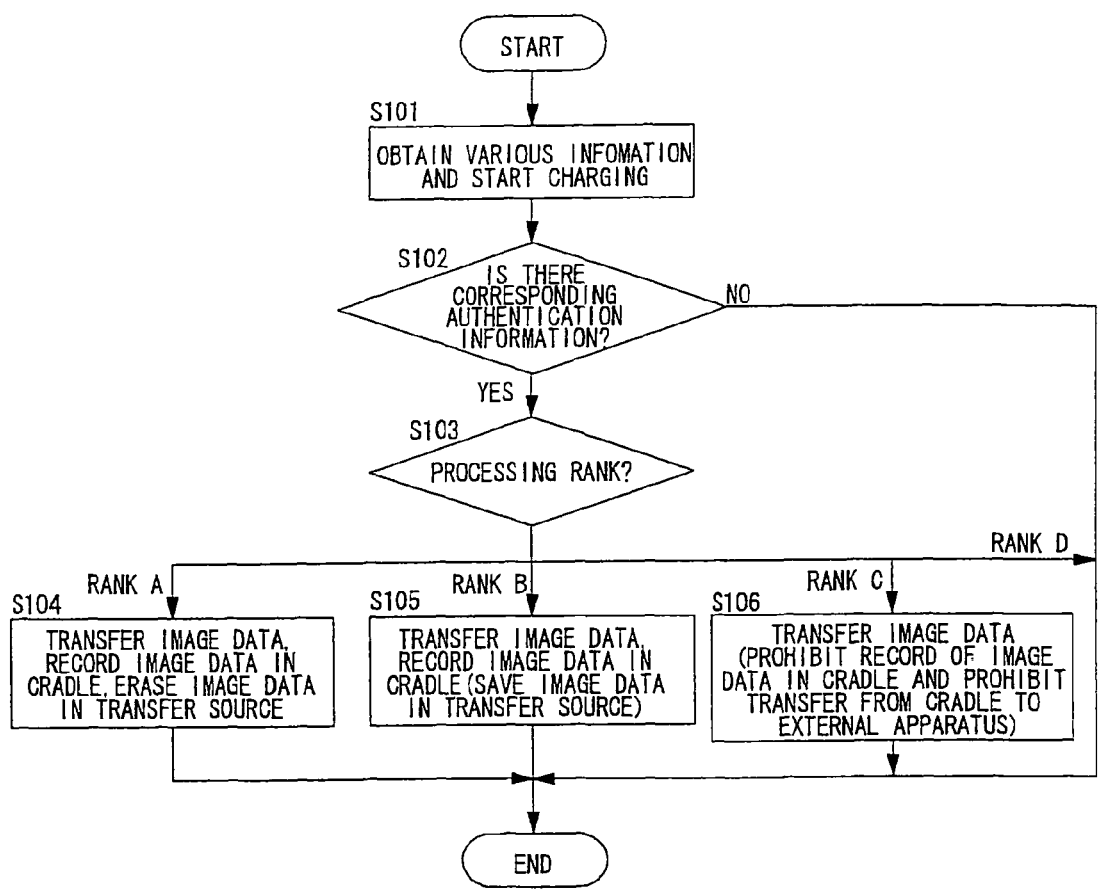
FIG. 3 is a flowchart explaining a series of operations of the electronic camera system of the first embodiment.

Next, with reference to a flowchart of FIG. 3, a series of operations of the electronic camera system of the first embodiment will be explained.

Step S101: the cradle controlling section 41 detects a connection of the electronic camera 10 and the cradle 30 by an input of the microswitch 33. Next, the cradle controlling section 41 communicates with the CPU 21 and obtains the camera side authentication information from the CPU 21.

Then, the cradle controlling section 41 drives the charging device 36 to start a charging operation of the rechargeable battery 19.

Step S102: the cradle controlling section 41 verifies the camera side authentication information and the cradle side authentication information to determine whether there is corresponding cradle side authentication information or not. When there are corresponding cradle side authentication information (YES side), the flow goes to S103. Otherwise, when there is no corresponding cradle side authentication information (NO side), the cradle controlling section 41 continues the above-described charging operation without reading image data from the electronic camera 10. Therefore, in this case, flowing out of image data from the electronic camera 10 to the cradle 30 against the user's intention will not happen.

Step S103: the cradle controlling section 41 reads processing rank information corresponding to the cradle side authentication information in S102 and determines which of rank A to rank D the processing rank is. When it is the rank A, the flow goes to S104. When it is the rank B, the flow goes to S105. When it is the rank C, the flow goes to S106. Then, when it is the rank D, the cradle controlling section 41 continues the above-described charging operation without reading image data from the electronic camera 10. In this case, flowing out of image data from the electronic camera 10 to the cradle 30 against the user's intention will not happen.

Step S104: the cradle controlling section 41 requests the CPU 21 to transfer image data. The CPU 21 transfers image data to the cradle 30 from the hard disk 16 or the recording medium 23, and erases the image data in the transfer source. Then, the cradle controlling section 41 records the transferred image data in the recording section 37. Specifically, in the case of S104, the image data are stored in the cradle 30, and the transferred image data are deleted automatically from the electronic camera 10 and thereby the number of photographable frames are increased accordingly.

On the other hand, the user can view the image data recorded in the recording section 37 of the cradle 30 on a television or the like or can even transfer the image data from the cradle 30 to an external apparatus. Note that in S104, when available capacity in the recording section 37 runs out, the CPU 21 stops transfer and deletion of image data, and the cradle controlling section 41 performs alarm display meaning "defragmentation cannot be executed due to insufficient available capacity in the recording section 37" by a text, an icon or the like on the display section 40.

Step S105: the cradle controlling section 41 requests the CPU 21 to transfer image data. The CPU 21 transfers image data to the cradle 30 from the hard disk 16 or the recording medium 23. Then, the cradle controlling section 41 records the transferred image data in the recording section 37. Specifically, in the case of S105, while the image data are stored in the cradle 30, the image data in the transfer source are left as they are in the electronic camera 10. This processing in S105 is suitable when it is desired to save and carry favorite image data on the electronic camera 10 side, or when image data are backed up in a plurality of cradles 30.

Step S106: the cradle controlling section 41 requests the CPU 21 to transfer image data. The CPU 21 transfers image data to the cradle 30 from the hard disk 16 or the recording medium 23. Then, the cradle controlling section 41 outputs a reproduced image based on the transferred image data from the display I/F 34 to a television or the like. At this time, the cradle controlling section 41 does not perform recording of the imaged data in the recording section 37 and transferring of image data to an external apparatus. The processing in S106 is suitable when for example the electronic camera 10 is connected to another person's cradle 30 to reproduce a photographed image, or the like. Thus, an explanation of the operation of the first embodiment is completed.

Effects of the electronic camera system of the first embodiment will be explained below.

(1) In the first embodiment, image data are transferred from the electronic camera 10 to the cradle 30 only when the camera side authentication information and the cradle side authentication information have a correspondence relation (S102 to S106). Specifically, image data are transferred to the cradle 30 only when the user permits transfer of image data in advance by registration setting of authentication information, and thus flowing out of image data against the user's intention can be prevented. Also, the electronic camera 10 can be charged by connecting the electronic camera 10 and the cradle 30.

(2) In the first embodiment, since the transfer sequence of image data is executed automatically with an input of the microswitch 33 being a trigger (S101), complication in manipulation when transferring image data is eliminated. Also, since setting for when transferring image data can be customized in detail by registering the processing rank information, an electronic camera system with high convenience for users can be realized.

Explanation of Second Embodiment

Figure 4:
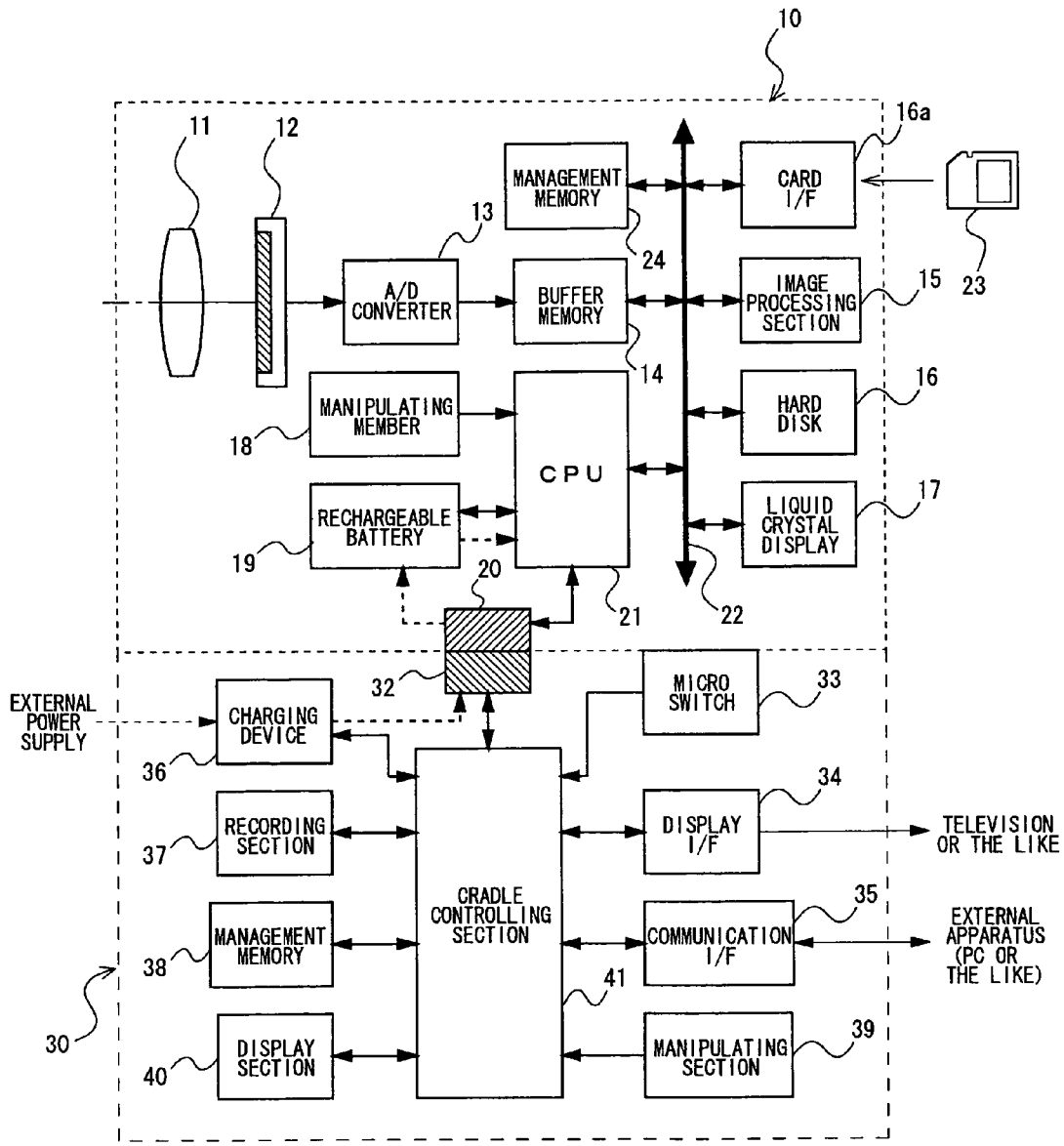
FIG. 4 is a block diagram showing a structure of an electronic camera system of a second embodiment.

FIG. 4 is a block diagram showing a structure of an electronic camera system of a second embodiment. Note that in the following explanations of embodiments, components which are common to the first embodiment are assigned the same reference numerals, and explanations thereof are omitted.

The second embodiment is a modification example of the first embodiment, and has a structure different from the first embodiment in that a management memory 24 recording a correspondence relation between the camera side authentication information and the processing rank information is provided on the electronic camera 10 side. Also, the CPU 21 of the second embodiment has a function to determine a possibility of transferring image data and various processing when transferring image data. Then, only the cradle side authentication information is recorded in the management memory 38 on the cradle 30 side.

In this second embodiment, the cradle controlling section 41 transmits the cradle side authentication information when the electronic camera 10 and the cradle 30 are connected, and the CPU 21 determines a possibility of transferring image data and various processing during transfer of image data. Also with the structure of the second embodiment, almost the same effects as in the first embodiment can be obtained.

Explanation of Third Embodiment

Figure 5:
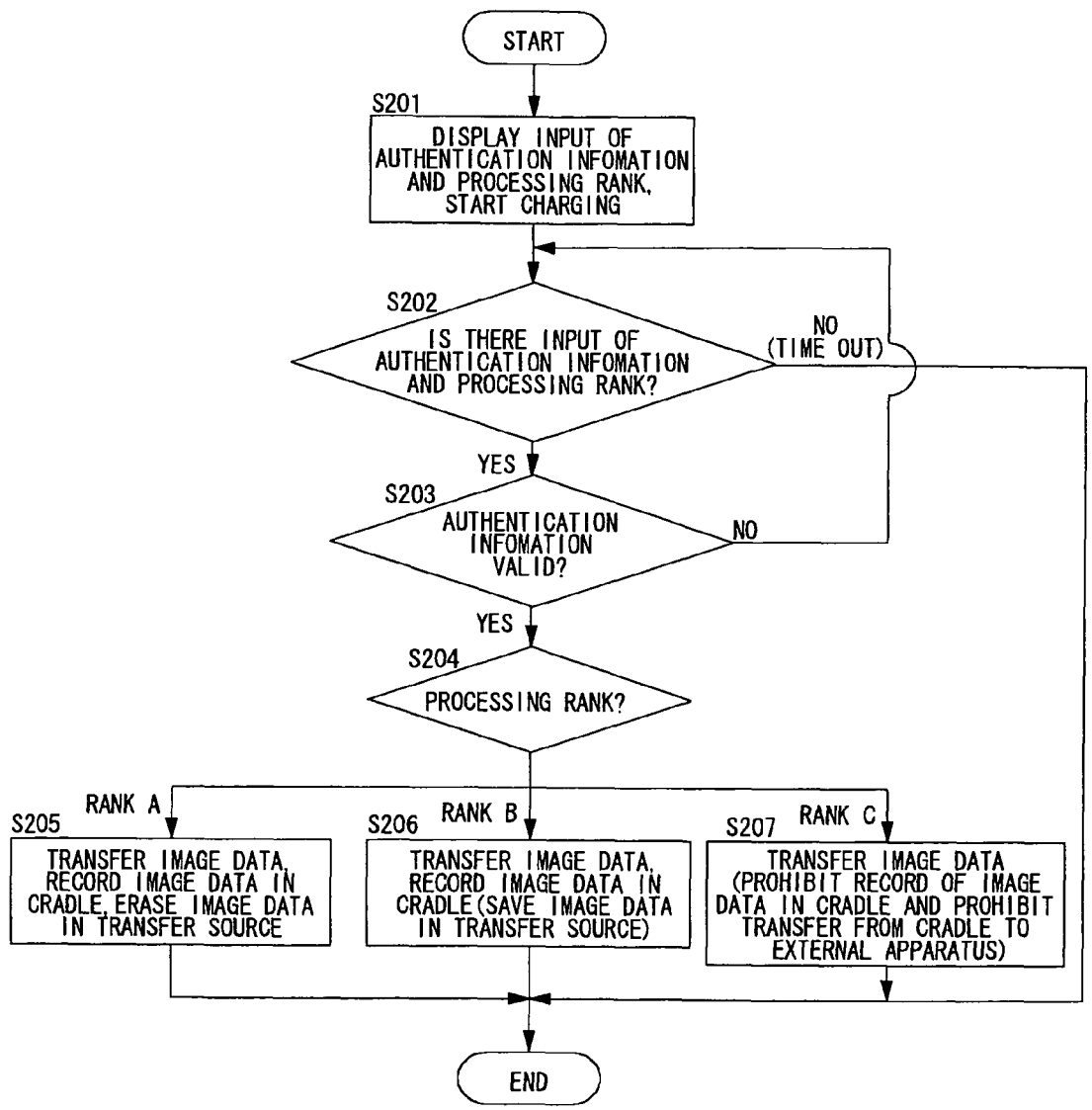
FIG. 5 is a flowchart explaining a series of operations of an electronic camera system of a third embodiment.

FIG. 5 is a flowchart explaining a series of operations of an electronic camera system of a third embodiment. Here, S205 to S207 of the third embodiment correspond respectively to S104 to S106 of the first embodiment, and hence duplicating explanations are omitted. Also, a block diagram of the electronic camera system of the third embodiment is common to the first embodiment and hence omitted from the drawings.

In this third embodiment, authentication information (password) set by the user is stored as the cradle side authentication information in the management memory 38, and the cradle controlling section 41 determines a possibility of transferring image data based on authentication information inputted by the user. Also, in the third embodiment, a processing rank corresponding to the processing rank information (rank A to rank C) of the first embodiment is inputted by the user.

Step S201: the cradle controlling section 41 detects a connection of the electronic camera 10 and the cradle 30 by an input of the microswitch 33. Next, the cradle controlling section 41 displays on the display section 40 a display to prompt inputting of authentication information and a processing rank (selection of the rank A to the rank C of the processing rank information of the first embodiment). Then, the cradle controlling section 41 drives the charging device 36 to start a charging operation of the rechargeable battery 19.

Step S202: the cradle controlling section 41 determines whether or not there are inputs of authentication information and a processing rank by the user from a manipulating section of the electronic camera 10 or the manipulating section of the cradle 30. When there are inputs (YES side), the flow goes to S203. When there are no input (NO side), the cradle controlling section 41 waits for an input by the user. Note that when there is no input for a predetermined time, the cradle controlling section 41 finishes the processing as it is, and continues only the aforementioned charging operation.

Step S203: The cradle controlling section 41 verifies the inputted authentication information and the authentication information in the management memory 38, and determines whether the inputted authentication information is valid or not. When the authentication information is valid (YES side), the flow goes to S204. On the other hand, when the authentication information is not valid (NO side), the flow returns to S202.

Step S204: the cradle controlling section 41 determines which of the rank A to the rank C the processing rank inputted with the authentication information is. When it is the rank A, the flow goes to S205. When it is the rank B, the flow goes to S206. When it is the rank C, the flow goes to S207.

Also in the above-described third embodiment, image data are transferred to the cradle 30 only when the user permits transfer of image data by registration setting of authentication information, and thus flowing out of image data against the user's intention can be prevented.

Explanation of Fourth Embodiment

Next, an electronic camera system of a fourth embodiment will be explained. A basic structure of the electronic camera system of the fourth embodiment is common to the electronic camera 10 and the cradle 30 shown in FIG. 4, and functions of part of components are different from the above embodiments. Accordingly, in the explanation of the fourth embodiment, a block diagram is omitted from the drawings, and components corresponding to the above embodiments are assigned the same reference numerals and duplicating explanations are omitted.

In the fourth embodiment, in the management memory 24 of the electronic camera 10, camera side authentication information and camera side connection history data are recorded. The camera side authentication information is constituted of different data for each of electronic cameras 10, and used by the cradle 30 as a connecting destination for identifying each of the electronic cameras 10. As an example, as the camera side authentication information, a serial number or a manufacturing code of the electronic camera 10 can be used. Of course, as the camera side authentication information, an arbitrary symbol sequence assigned to each of the electronic cameras 10 besides the serial number and so on may be used.

FIG. 6(a) is a view schematically showing the camera side connection history data. In the camera side connection history data, every time the electronic camera 10 is connected to the cradle 30, a connection history is recorded in a time-series manner by the CPU 21. In the camera side connection history data, as a connection history of one time, a connection date and time, cradle side authentication information indicating the cradle 30 as a connecting destination, and an operation mode when being connected are recorded in a correlated state. Here, the operation mode defines a manipulation which can be executed by the user in a state that the electronic camera 10 and the cradle 30 are connected. Note that an explanation of the cradle side authentication information will be described later. In an example of FIG. 6(a), data of one line correspond to a connection history of one time, and the connection histories become newer as they go downward.

The CPU 21 of the electronic camera 10 controls transmission/reception of data to/from the cradle 30 as a connecting destination and also manages the camera side connection history data. Particularly, the CPU 21 transmits the camera side authentication information to the cradle 30 when being connected to the cradle 30. Also, the CPU 21 searches for the camera side connection history data based on the cradle side authentication information, which will be described later, received from the cradle 30 when being connected to the cradle 30 and returns a search result to the cradle 30.

In the management memory 38 of the cradle 30, the cradle side authentication information and cradle side connection history data are recorded. The cradle side authentication information is constituted of different data for each of cradles 30, and used by the electronic camera 10 as a connecting destination for identifying each of the cradles 30. As an example, as the cradle side authentication information, a serial number or a manufacturing code of the cradle 30 can be used. Of course, as the cradle side authentication information, an arbitrary symbol sequence assigned to each of the cradles 30 besides the serial number and so on may be used.

FIG. 6(b) is a view schematically showing the cradle side connection history data. In the cradle side connection history data, every time the cradle 30 is connected to the electronic camera 10, a connection history is recorded in a time-series manner by the cradle side controlling section 41. In the cradle side connection history data, as a connection history of one time, a connection date and time, the camera side authentication information indicating the electronic camera 10 as a connecting destination, and an operation mode when being connected are recorded in a correlated state. In an example of FIG. 6(b), data of one line correspond to a connection history of one time, and the connection histories become newer as they go downward.

The cradle controlling section 41 of the cradle 30 controls transmission/reception of data to/from the electronic camera 10 as a connecting destination and also manages the cradle side connection history data. Particularly, the cradle controlling section 41 transmits the cradle side authentication information to the electronic camera 10 when being connected to the electronic camera 10. Also, the cradle controlling section 41 searches for the cradle side connection history data based on the camera side authentication information received from the electronic camera 10 when being connected to the electronic camera 10.

Also, the cradle controlling section 41 determines the above-described operation mode when being connected to the electronic camera 10, and executes the overall control of the entire system in a state that the electronic camera 10 and the cradle 30 are connected. Here, the cradle controlling section 41 can select the operation mode from either of the first operation mode and the second operation mode when deciding the operation mode.

In the first operation mode, when the electronic camera 10 and the cradle 30 are connected, the user can perform various manipulations with almost no constraint. This first operation mode is selected, for example, in a situation that the user permits transfer of data or the like between the electronic camera 10 and the cradle 30, such as when the owners of the electronic camera 10 and the cradle 30 match.

On the other hand, in the second operation mode, the user is restricted in executable manipulation as compared to the first operation mode. This second operation mode is selected, for example, in a situation that the owners of the electronic camera 10 and the cradle 30 are different, and the user thinks that it is favorable to prevent flowing out of data from occurring. Note that specific contents of operations of the first operation mode and the second operation mode will be described later.

Operations of the CPU 21 and the cradle controlling section 41 in selection of the operation mode in the fourth embodiment will be explained below with reference to the flowchart of FIG. 7.

Step 301: upon detection of a connection of the electronic camera 10 and the cradle 30 by an input of the microswitch 33, the cradle controlling section 41 of the cradle 30 transmits the cradle side authentication information to the electronic camera 10.

Step 302: upon reception of the cradle side authentication information (S301), the CPU 21 of the electronic camera 10 transmits the camera side authentication information to the cradle 30.

Step 303: the CPU 21 of the electronic camera 10 searches for the camera side connection history data based on the cradle side authentication information (S301), and sequentially executes the following processing of (a1) to (a3).

(a1) Firstly, the CPU 21 determines whether there is a prior connection history or not (in other words, whether the electronic camera 10 has never been connected to the cradle 30). When there is a prior connection history, the CPU 21 performs the next processing of (a2). On the other hand, when there is no prior connection history, the CPU 21 notifies the cradle 30 that a connection of this time is a first connection. Note that in this case, the CPU 21 does not need to perform the processing of (a2) and thereafter in S303.

(a2) Secondly, the CPU 21 determines whether cradle side authentication information corresponding to the oldest connection history and the cradle side authentication information (S301) of this time match or not (in other words, whether the electronic camera 10 has been connected to a plurality of cradles 30 or not). When the both match, the CPU 21 notifies the cradle 30 that the cradle 30 is determined to match with a connecting destination of a first connection. Note that in this case, the CPU 21 does not need to perform the processing of (a3) and thereafter in Step S303. On the other hand, when the both do not match, the CPU 21 performs the next processing of (a3).

(a3) Thirdly, the CPU 21 extracts connection histories corresponding to the cradle side authentication information (S301) of this time. Then, the CPU 21 notifies the cradle 30 of an operation mode recorded in the latest connection history among extracted connection histories. Note that when there is no connection history corresponding to the cradle side authentication information (S301) of this time in the electronic camera 10, the CPU 21 instructs the cradle 30 to select the second operation mode.

Step 304: on the other hand, the cradle controlling section 41 of the cradle 30 searches for the cradle side connection history data based on the camera side authentication information (S302) and sequentially executes the following processing of (b1) to (b3). Note that the cradle controlling section 41 can execute the operation of S304 almost in parallel to the operation of S303 on the electronic camera 10 side.

(b1) Firstly, the cradle controlling section 41 determines whether there is a prior connection history or not (in other words, whether the cradle 30 has never been connected to the electronic camera 10). When there is a prior connection history, the cradle controlling section 41 performs the next processing of (b2). On the other hand, when there is no prior connection history, the cradle controlling section 41 determines that that a connection of this time is a first connection. Note that in this case, the cradle controlling section 41 does not need to perform the processing of (b2) and thereafter in S304.

(b2) Secondly, the cradle controlling section 41 determines whether camera side authentication information corresponding to the oldest connection history and the camera side authentication information (S302) of this time match or not (in other words, whether the cradle 30 has been connected to a plurality of electronic cameras 10 or not). When the both match, the cradle controlling section 41 determines that the electronic camera 10 match with a connecting destination of a first connection. Note that in this case, the cradle controlling section 41 does not need to perform the processing of (b3) and thereafter in Step S304. On the other hand, when the both do not match, the cradle controlling section 41 performs the next processing of (b3).

(b3) Thirdly, the cradle controlling section 41 extracts connection histories corresponding to the camera side authentication information (S302) of this time. Then, the cradle controlling section 41 obtains data of an operation mode recorded in the latest connection history among extracted connection histories. Note that when there is no connection history corresponding to the camera side authentication information (S302) of this time in the cradle 30, the cradle controlling section 41 selects the second operation mode.

Step 305: the cradle controlling section 41 determines whether the electronic camera 10 and the cradle 30 are mutually in a first connection or not based on the processing results in S303 and S304.

When being mutually in a first connection (YES side), it corresponds to the case where an owner connects the electronic camera 10 and the cradle 30 for the first time which are both brand new for example, and it is conceivable that there is a low possibility that owners of the electronic camera 10 and the cradle 30 are different. Accordingly, the cradle controlling section 41 goes to S310.

On the other hand, when at least one of the electronic camera 10 and the cradle 30 is not in a first connection (NO side), there is a high possibility that owners of the electronic camera 10 and the cradle 30 are different. Accordingly, the cradle controlling section 41 goes to S306 to further perform the following determination.

Step 306: the cradle controlling section 41 determines whether or not the electronic camera 10 and the cradle 30 mutually match with a connecting destination of a first connection based on the processing results in S303 and S304.

When mutually matching with a connecting destination of a first connection (YES side), it is conceivable that there is a low possibility that owners of the electronic camera 10 and the cradle 30 are different. Therefore, the cradle controlling section 41 goes to S310.

On the other hand, when at least one of the electronic camera 10 and the cradle 30 is not a connecting destination of a first connection (NO side), there is a high possibility that owners of the electronic camera 10 and the cradle 30 are different. Accordingly, the cradle controlling section 41 goes to S307 and further performs the following determination.

Step 307: the cradle controlling section 41 determines whether the operation mode of the latest connection history is the first operation mode or not based on the processing results in S303 and S304. When the above condition is satisfied (YES side), it is conceivable that the user allows an operation in the first operation mode in this combination of the electronic camera 10 and the cradle 30. Accordingly, the cradle controlling section 41 goes to S310. On the other hand, when the above condition is not satisfied (NO side), the cradle controlling section 41 goes to S308.

Step 308: the cradle controlling section 41 displays a confirmation screen of an operation mode on the display section 40 or the like. This confirmation screen includes a message to confirm with the user whether to limit the function or not when being connected (whether to connect in the second operation mode or not) and selection items (items such as Yes/No) which can be inputted via a GUI format. Then, the cradle controlling section 41 accepts a specification input regarding the aforementioned selection items via the manipulating section 39 from the user. Note that the confirmation screen is omitted from the drawings.

Step 309: the cradle controlling section 41 determines whether or not there is a specifying input to maintain the operation mode in the second operation mode in S308. In the case (YES side) of a specifying input of an item to maintain the operation mode (item Yes in the confirmation screen), the flow goes to S311. On the other hand, in the case of a specifying input of an item to change the operation mode (item No in the confirmation screen), the flow goes to S310.

Step 310: in this case, the cradle controlling section 41 selects the first operation mode. Thereafter, the cradle controlling section 41 goes to S312.

Step 311: in this case, the cradle controlling section 41 selects the second operation mode.

Step 312: the cradle controlling section 41 adds data of a connection history of this time to the cradle side connection history data in the management memory 38. Also, the cradle controlling section 41 transmits data of the connection history of this time to the electronic camera 10.

Step 313: The CPU 21 of the electronic camera 10 adds data of the connection history of this time to the camera side connection history data in the management memory 24 based on the data transmitted in S312. Thus, the explanation of the flowchart of FIG. 7 is completed.

Next, differences in control of the cradle controlling section 41 in the first operation mode and the second operation mode are explained specifically.

(A) the cradle controlling section 41 in the first operation mode can read image data in the electronic camera 10 and reproduce and display the image data. Specifically, the cradle controlling section 41 can read temporarily the image data into a buffer memory (not shown) of the cradle 30 from the electronic camera 10, and output a reproduced image to the display section 40 or the display I/F 34. The cradle controlling section 41 in the first operation mode can also reproduce and display image data to which protection is specified, which means that reproduction and erasing in other apparatuses are prohibited.

On the other hand, the cradle controlling section 41 in the second operation mode can read, reproduce and display image data in the electronic camera 10, similarly to the first operation mode. However, the cradle controlling section 41 in the second operation mode always execute an operation of erasing image data from the buffer memory of the cradle 30 after reproduction is finished. Accordingly, a problem that reproduction and display of image data are performed only by the cradle 30 without limit by the image data remaining in the buffer memory of the cradle 30 can be prevented.

Also, the cradle controlling section 41 in the second operation mode prohibits reproduction and display of image data to which the above-described protection is specified. Therefore, in the second operation mode, image data to which the protection is specified will not be reproduced against the user's intention. Of course, also in the second operation mode, the cradle controlling section 41 may individually reproduce and display image data to which the protection is specified based on a manipulation by the user from the manipulating section 39. Note that when image data to which the protection is specified is to be reproduced and displayed in the second operation mode, it is preferable that the cradle controlling section 41 requests the user for authentication such as inputting of a password.

(B) the cradle controlling section 41 in the first operation mode can transfer image data in the electronic camera 10 to the recording section 37 for recording. Also, the cradle controlling section 41 in the first operation mode can instruct the CPU 21 to erase image data in the transfer source on the electronic camera 10 side. Of course, the cradle controlling section 41 can also leave the image data in the transfer source as they are in the electronic camera 10 and copy the image data.

Further, the cradle controlling section 41 in the first operation mode can limit image data to be transferred to the cradle 30 for recording. For example, when pay image data which are purchased by downloading are recorded in the electronic camera 10, the cradle controlling section 41 refers to information in the header of the pay image data to prohibit copying to the cradle 30. In this case, the cradle controlling section 41 can transfer only image data photographed by the electronic camera 10 to the cradle 30 for recording. Note that when a sample image having a low resolution that can be distributed freely is attached to the aforementioned pay image data, the cradle controlling section 41 may permit transfer and recording of the aforementioned sample image.

On the other hand, the cradle controlling section 41 in the second operation mode prohibits transfer of image data in the electronic camera 10 to the recording section 37 for recording. Therefore, in the second operation mode, the image data recorded in the electronic camera 10 will not flow out to the cradle 30 against the user's intention. Of course, in the second operation mode, the cradle controlling section 41 may transfer to the recording section 37 image data which are individually specified by the user by a manipulation from the manipulating section 39 or the like. As an example, by pressing the release button 38a of the electronic camera 10 by the user when image data is reproduced and displayed, the cradle controlling section 41 transfers to the recording section 37 the image data which are being reproduced and displayed. Note that when transfer of image data is performed in the second operation mode, it is preferable that the cradle controlling section 41 requests the user for authentication such as inputting of a password.

(C) The cradle controlling section 41 in the first operation mode can transfer image data from the recording section 37 of the cradle 30 to the electronic camera 10. The cradle controlling section 41 can also erase image data in a transfer source existing in the recording section 37. Of course, the cradle controlling section 41 can also leave the image data in the transfer source in the recording section 37 as they are and copy the image data. Further, the cradle controlling section 41 in the first operation mode can also limit image data to be transferred to the electronic camera 10, similarly to the above-described (B).

On the other hand, the cradle controlling section 41 in the second operation mode prohibits transfer of image data from the recording section 37 of the cradle 30 to the electronic camera 10. Therefore, in the second operation mode, image data recorded in the cradle 30 will not flow out to the electronic camera 10 against the user's intention. Of course, also in the second operation mode, the cradle controlling section 41 may transfer to the electronic camera 10 image data which are specified individually by the user by a manipulation from the manipulating section 39 or the like. Note that when performing transfer of image data to the electronic camera 10 in the second operation mode, it is preferable that the cradle controlling section 41 requests the user for authentication such as inputting of a password.

Here, when image data transferred from a plurality of electronic cameras 10 are recorded in the recording section 37, the cradle controlling section 41 may prohibit re-transfer of image data transferred from different electronic cameras 10. Specifically, in this case, only returning of image data which are transferred before from the electronic camera 10 as a connecting destination is allowed. For example, based on information (serial number) of the electronic camera 10 recorded in a header of respective image data, the cradle controlling section 41 transfer the image data to the electronic camera 10 when the electronic camera 10 as a transfer source match with the electronic camera 10 as a transfer destination. Thus, prevention of flowing out of image data against the user's intention becomes easy.

(D) The cradle controlling section 41 in the first operation mode reads image data from the electronic camera 10 and can output image data to an external apparatus via the communication I/F 35. Thus, the user can perform, for example, (1) saving of image data in an external apparatus, (2) printing of a screen by an external apparatus having a printing function (3) uploading of image data to a homepage or the like on the Internet, (4) mail distribution of image data, and so on.

On the other hand, the cradle controlling section 41 in the second operation mode prohibits outputting of image data to an external apparatus via the communication I/F 35. Therefore, in the second operation mode, image data will not flow out to the external apparatus against the user's intention. Of course, also in the second operation mode, the cradle controlling section 41 may output image data which are specified individually by the user by a manipulation from the manipulating section 39 or the like to the external apparatus. Note that when performing outputting of image data to the external apparatus in the second operation mode, it is preferable that the cradle controlling section 41 requests the user for authentication such as inputting of a password.

(E) The cradle controlling section 41 in the first operation mode executes an editing manipulation of image data in the recording section of the cradle 30 by an input by the user from the manipulating member 18 of the electronic camera 10. Also, the cradle controlling section 41 in the first operation mode executes an editing manipulation of image data recorded in the recording medium 23 of the electronic camera 10 or the like, by an input from the manipulating section 39 of the cradle 30.

Here, the editing manipulation of image data includes (1) erasing of image data, (2) changing of status of image data (for example, execution/release of protection specification), (3) image processing on image data, (4) generation of print setting data complying with the DPOF (Digital Print Order Format) standard, (5) generation of scenario data for reproduction, and so on. Note that in the scenario data for reproduction, there are recorded data indicating a display order in the case where images of a plurality of image data are reproduced sequentially, display timing, video effects, BGM and sound effects during reproduction, and so on.

On the other hand, the cradle controlling section 41 in the second operation mode prohibits an editing manipulation of image data recorded in the cradle 30 from the manipulating member 18 of the electronic camera 10. Also, the cradle controlling section 41 in the second operation mode prohibits an editing manipulation of image data recorded in the electronic camera 10 from the manipulating section 39 of the cradle 30. Thus, when the electronic camera 10 and the cradle 30 are connected, tampering of data from an apparatus as a connecting destination can be prevented.

(F) The cradle controlling section 41 in the first operation mode transfers between the electronic camera 10 and the cradle 30 the aforementioned print setting data and scenario data for reproduction similarly to image data.

On the other hand, the cradle controlling section 41 in the second operation mode prohibits transfer and copying of the aforementioned print setting data and scenario data for reproduction between the electronic camera 10 and the cradle 30. This is because there is a fear that printing or reproduction of an image is performed against the user's intention by executing these data. Of course, also in the second operation mode, the cradle controlling section 41 may execute transfer and copying of the aforementioned print setting data and scenario data for reproduction according to a manipulation from the manipulating section 39. Note that in this case, it is preferable that the cradle controlling section 41 requests the user for authentication such as inputting of a password.

(G) The cradle controlling section 41 in the first operation mode executes charging of the electronic camera 10 when the electronic camera 10 and the cradle 30 are connected. On the other hand, the cradle controlling section 41 in the second operation mode can switch on/off of a charging function of the electronic camera 10 according to setting by the user.

(H) The cradle controlling section 41 in the first operation mode executes, if necessary, defragmentation of the hard disk 16 of the electronic camera 10 when the electronic camera 10 and the cradle 30 are connected. Also, the cradle controlling section 41 in the first operation mode executes, if necessary, updating of a firmware program of the electronic camera 10 when the electronic camera 10 and the cradle 30 are connected. On the other hand, the cradle controlling section 41 in the second operation mode do not execute defragmentation of the hard disk 16 or updating of the firmware program.

Effects of the fourth embodiment will be explained below.

In the electronic camera system of the fourth embodiment, the cradle controlling section 41 selects the operation mode when being connected based on authentication results of the electronic camera 10 and the cradle 30. Then, when the cradle controlling section 41 operates in the first operation mode, the user can perform various manipulations with almost no constraint. On the other hand, when the cradle controlling section 41 operates in the second operation mode, the user is restricted significantly in terms of reproduction of an image, transfer of image data, and so on with the cradle 30. Accordingly, in the electronic camera system of the fourth embodiment, flowing out of image data against the user's intention can be prevented easily.

Also, in the electronic camera system of the fourth embodiment, the operation mode when being connected is selected based on a connection history by the camera side connection history data and the cradle side connection history data. Therefore, since the cradle controlling section 41 selects the optimum operation mode according to a situation, the user does not need to perform a troublesome setting manipulation.

Explanation of Fifth Embodiment

FIG. 8 is a block diagram showing a structure of an electronic camera system of a fifth embodiment. The electronic camera system of the fifth embodiment is a modification example of the fourth embodiment, in which the electronic camera 10 and the cradle 30 can transmit/receive image data via radio communication. Note that also in FIG. 8, components corresponding to the above embodiments are assigned the same reference numerals and duplicating explanations are omitted.

The electronic camera 10 and the cradle 30 of the fifth embodiment further have radio communication modules 25, 42, respectively. The radio communication modules 25, 42 control communication with another radio communication module in compliance with the specification defined in IEEE802.11, which is a standard for wireless LAN. For example, when transmitting image data to another apparatus, the radio communication modules 25, 42 convert the image data into data which can be radio-communicated, and data after the conversion are transmitted to another apparatus via an antenna (not shown).

In this fifth embodiment, even when the electronic camera 10 and the cradle 30 are not connected via the connecting terminals, it becomes possible to manage transfer of image data and management of reproduction, similarly to the fourth embodiment.

Supplementary Items of the Embodiments (1) The cradle of the present invention is not limited to the case of being constituted of a single apparatus as in the above-described embodiments. For example, a structure (omitted from the drawings) is possible such that the cradle is connected to a personal computer and the personal computer realizes the functions of the cradle controlling section 41, the recording section, and so on in the above-described embodiments.

(2) In the above-described embodiments, an example of starting the transfer sequence of image data with detection of a connection of the electronic camera and the cradle by the microswitch being a trigger is explained. However, in the present invention, the transfer sequence may be started with a transfer instructing manipulation by the user being a trigger (for example, pressing a transfer button on the cradle). Also, a means (for example, a microswitch, detection of a connection by conduction of the first connecting terminal, or the like) to detect a connection with the cradle may be provided on the electronic camera side.

(3) In the above-described embodiments, an example of performing transfer of image data and a charging operation in parallel is shown, but the present invention embraces both a structure to charge the rechargeable battery after transfer processing of image data finishes and a structure to executes transfer processing of image data after charging finishes.

(4) Also in the third embodiment, the authentication information and the processing rank information may be correlated and recorded in the management memory, and inputting of a processing rank by the user may be omitted.

(5) In the third embodiment, a publicly known biometrics authentication means (for example, a finger print recognition apparatus, an iris recognition apparatus, or the like) may be provided in the electronic camera or the cradle, and the user may input authentication information with the biometrics authentication means (note that the biometrics authentication means is omitted from the drawings).

(6) In the above-described fourth embodiment, an example in which the cradle controlling section 41 performs the overall control of the electronic camera system is explained. However, in the present invention, a structure is possible such that the electronic camera executes the overall control of the electronic camera system, and the CPU 21 executes selection of the first operation mode and the second operation mode and control in the respective operation modes.

(7) In the above-described fourth embodiment, there is explained a structure in which the electronic camera and the cradle records data of a connection history respectively, and the connection history and the authentication information are verified in both the apparatuses. However, in the present invention, a structure is possible such that only either the electronic camera or the cradle records the data of a connection history and thereby data of a connection history of one are verified with authentication information in the other apparatus. Also, in the fourth embodiment, a correspondence relation between the authentication information and the operation mode may be recorded in the management memory of one apparatus, and the one apparatus may determine the operation mode based on the authentication information in the other apparatus. In this case, recording of the data of a connection history is no longer necessary.

(8) In selection of the operation mode in the fourth embodiment, when the first operation mode is selected in the confirmation screen (S308), the cradle controlling section 41 may request for authentication such as inputting of a password.

(9) In the fifth embodiment, an example of constructing the electronic camera system with the electronic camera and the cradle which have a radio communication function is explained. However, in the present invention, without being limited to the cradle, the electronic camera system corresponding to the fifth embodiment can be constituted of a combination of an electronic camera and an image storage apparatus, each of which having a radio communication function.

(10) In the fifth embodiment, an example of performing data communication of the electronic camera via a wireless LAN is explained, but the radio communication means between the electronic camera and the image storage apparatus is not limited to the above description. For example, as the radio communication means, IRDA, DLNA, Bluetooth®, a telephone line or satellite communication may be used.

(11) Note that in the above-described embodiments, an example of data transmission/reception of image data is mainly explained, but for example audio data or the like may be included in the subject of the data communication.

The many features and advantage of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An electronic camera system, comprising:
an electronic camera which comprises an image pickup section which photoelectrically converts a subject image from a photographing optical system to generate image data, a first recording section which records said image data, a first connecting terminal used for transmission/ reception of data to/from an outside of said camera, and a camera controlling section which transfers said image data to the outside of said camera via said first connecting terminal; and a cradle which comprises a second connecting terminal capable of engaging with said first connecting terminal, a cradle controlling section which transmits/receives data to/from said electronic camera via said second connecting terminal, and a second recording section capable of recording said image data transferred from said electronic camera, wherein:

at least one of said electronic camera and said cradle further comprises a transfer determination section which determines a possibility of transferring said image data based on predetermined authentication information; and said camera controlling section transfers said image data from said first recording section to said cradle when there is a permission from said transfer determination section;

said transfer determination section further determines a possibility of recording said image data to said second recording section based on said authentication information; and said cradle controlling section either transfers said image data to said second recording section and erases said image data in said first recording section or transfers said image data to said second recording section and leaves said image data in said first recording section, when a permission is given from said transfer determination section.

2. The electronic camera system according to claim 1, wherein:

said electronic camera further comprises a first authentication information holding section which holds camera side authentication information;

said cradle further comprises a second authentication information holding section which holds cradle side authentication information correlated with specific camera side authentication information; and at least one of said camera controlling section and said cradle controlling section verifies said camera side authentication information and said cradle side authentication information to determine a possibility of transferring said image data.

3. The electronic camera system according to claim 1, wherein said transfer determination section has an input section which obtains an authentication input by a user, and an authentication section which performs said transfer permission when said authentication input is valid.

4. The electronic camera system according to claim 1, wherein:

at least one of said electronic camera and said cradle further comprises a connection detection section which detects a connection with said electronic camera; and said transfer determination section executes automatically a determination operation of a possibility of transfer when said electronic camera and said cradle are connected.

5. The electronic camera system according to claim 1, wherein:

said electronic camera further comprises a rechargeable battery; and said cradle further comprises a charging device used for charge of said rechargeable battery.

6. A cradle which is connected to an electronic camera to constitute an electronic camera system, comprising:

a connecting terminal used for transmission/reception of data to/from said electronic camera; a transfer determination section which determines a possibility of transferring said image data from said electronic camera based on predetermined authentication information; a cradle controlling section which receives image data from said electronic camera via said connecting terminal when there is a permission from said transfer determination section; and a second recording section capable of recording said image data, wherein:

said transfer determination section further determines a possibility of recording said image data to said second recording section based on said authentication information; and said cradle controlling section either transfers said image data to said second recording section and erases said image data in said electronic camera or transfers said image data to said second recording section and leaves said image data in said first recording section, when a permission is given from said transfer determination section.

7. An electronic camera system, comprising:

an electronic camera which comprises an image pickup section which photoelectrically converts a subject image from a photographing optical system to generate image data, and a first communication section which executes transmission/reception of data to/from an outside and outputs said image data to the outside of said camera; and an image storage apparatus which comprises a second communication section which transmits/receives data to/from said first communication section, a first recording section capable of recording said image data, and a display output section which outputs a display image based on said image data to an image display apparatus, wherein:

one apparatus selected from said electronic camera and said image storage apparatus further comprises a first authentication recording section which records first authentication information;

an other apparatus selected from said electronic camera and said image storage apparatus further comprises a controlling section which executes selectively one of a first operation mode and a second operation mode when being connected to said one apparatus, and a mode selecting section which selects one of said first operation mode and said second operation mode based on said first authentication information obtained from said one apparatus;

said controlling section in said first operation mode reads said image data temporarily into a buffer memory of an image storage apparatus side and permits outputting of said display image by said display output section and recording of said image data to said first recording section; and said controlling section in said second operation mode reads said image data temporarily into said buffer memory and permits outputting of said display image by said display output section, and meanwhile prohibits recording of said image data to said first recording section.

8. The electronic camera system according to claim 7, wherein:

said other apparatus further comprises a first history recording section which records a connection history with said one apparatus together with said first authentication information of a connecting destination; and said mode selecting section selects one of said first operation mode and said second operation mode based on data in said first history recording section.

9. The electronic camera system according to claim 8, wherein:
said other apparatus further comprises a second authentication recording section which records second authentication information;
said one apparatus further comprises a second history recording section which records a connection history with said other apparatus together with said second authentication information of a connecting destination; and
said mode selecting section selects said first operation mode and said second operation mode based on data in said first history recording section and said second history recording section.

10. The electronic camera system according to claim 9, wherein
said mode selecting section selects said first operation mode when said one apparatus and said other apparatus mutually match with a connecting destination at a time of a first connection.

11. The electronic camera system according to claim 9, wherein
said mode selecting section selects said second operation mode when at least one of said one apparatus and said other apparatus does not match with a connecting destination at a time of a first connection.

12. The electronic camera system according to claim 9, wherein:
at least one of said one apparatus and said other apparatus further comprises a first manipulating section which accepts a change input of said first operation mode and said second operation mode from a user;
at least one of said first history recording section and said second history recording section further records operation mode data indicating an operation mode selected by said change input in a correlated manner with said connection history; and
said mode selecting section selects said first operation mode and said second operation mode based on said operation mode data.

13. The electronic camera system according to claim 7, wherein:
said image storage apparatus further comprises a data output section which transfers said image data to an external apparatus which is different from said electronic camera;
said controlling section in said first operation mode permits transfer of said image data to said external apparatus; and
said controlling section in said second operation mode prohibits transfer of said image data to said external apparatus.

14. The electronic camera system according to claim 7, wherein:
said electronic camera further comprises a second recording section capable of recording said image data;
said controlling section in said first operation mode permits transfer of said image data from said first recording section to said second recording section; and
said controlling section in said second operation mode prohibits transfer of said image data from said first recording section to said second recording section.

15. The electronic camera system according to claim 7, wherein:

said electronic camera further comprises a second manipulating section which accepts a manipulation from a user;
said controlling section in said first operation mode permits manipulating on data in said first recording section by said second manipulating section; and
said controlling section in said second operation mode prohibits manipulating on data in said first recording section by said second manipulating section.

16. The electronic camera system according to claim 7, wherein:
said electronic camera further comprises a second recording section capable of recording said image data;
said image storage apparatus further comprises a third manipulating section which accepts a manipulation from a user;
said controlling section in said first operation mode permits manipulating on data in said second recording section by said third manipulating section; and
said controlling section in said second operation mode prohibits manipulating on data in said second recording section by said third manipulating section.

17. The electronic camera system according to claim 7, wherein
said image data is deleted from said buffer memory after display of said display image is finished.

18. An electronic camera constituting an electronic camera system together with an image storage apparatus which comprises a first authentication recording section which records first authentication information, a second communication section which executes transmission/reception of data to/from an outside, a first recording section, and a display output section which outputs a display image based on said image data to an image display apparatus, said electronic camera comprising:
an image pickup section which photoelectrically converts a subject image from a photographing optical system to generate image data;
a first communication section which executes transmission/reception of data to/from said second communication section and outputs said image data to said image storage apparatus;
a controlling section which executes selectively one of a first operation mode and a second operation mode when being connected to said image storage apparatus;
a first history recording section which records a connection history with said image storage apparatus together with said first authentication information of a connecting destination; and
a mode selecting section which selects one of said first operation mode and said second operation mode based on said first authentication information obtained from said image storage apparatus and data in said first history recording section, wherein:
said controlling section in said first operation mode reads said image data temporarily into a buffer memory of an image storage apparatus side and permits outputting of said display image by said display output section and recording of said image data to said first recording section; and
said controlling section in said second operation mode reads said image data temporarily into said buffer memory and permits outputting of said display image by said display output section, and meanwhile prohibits recording of said image data to said first recording section.

19. An image storage apparatus which constitutes an electronic camera system together with an electronic camera which comprises a first authentication recording section which records first authentication information, an image pickup section which generates image data, and a first communication section which executes transmission/reception of data to/from an outside, said image storage apparatus comprising:

- a second communication section which transmits/receives data to/from said first communication section;
- a first recording section capable of recording said image data;
- a display output section which outputs a display image based on said image data to an image display apparatus;
- a controlling section which executes selectively one of a first operation mode and a second operation mode when being connected to said electronic camera;
- a first history recording section which records a connection history with said electronic camera together with said first authentication information of a connecting destination; and
- a mode selecting section which selects one of said first operation mode and said second operation mode based on said first authentication information obtained from said electronic camera and data in said first history recording section, wherein:
- said controlling section in said first operation mode reads said image data temporarily into a buffer memory of an image storage apparatus side and permits outputting of said display image by said display output section and recording of said image data to said first recording section; and
- said controlling section in said second operation mode reads said image data temporarily into said buffer memory and permits outputting of said display image by said display output section, and meanwhile prohibits recording of said image data to said first recording section.

20. A non-transitory computer readable medium storing a program for an image storage apparatus which constitutes an electronic camera system together with an electronic camera which comprises a first authentication recording section which records first authentication information, an image pickup section which generates image data, and a first communication section which executes transmission/reception of data to/from an outside, wherein when said image storage apparatus comprises a second communication section which transmits/receives data to/from said first communication section, a first recording section capable of recording said image data, a display output section which outputs a display image based on said image data to an image display apparatus, a controlling section, and a first history recording section which records a connection history with said electronic camera together with said first authentication information of a connecting destination, said program causes said controlling section to execute the steps of:

selecting one of said first operation mode and said second operation mode based on said first authentication information obtained from said electronic camera and data in said first history recording section;

permitting said display output section to output said display image by reading said image data temporarily into a buffer memory of an image storage apparatus side and permitting said image data to be recorded in said first recording section, when said first operation mode is selected while being connected to said electronic camera; and permitting said display output section to output said display image by reading said image data temporarily into said buffer memory, while prohibiting said image data to be recorded in said first recording section, when said second operation mode is selected while being connected to said electronic camera.

* * * * *